United States Patent
Herz et al.

(10) Patent No.: US 8,596,996 B2
(45) Date of Patent: Dec. 3, 2013

(54) PUMP HAVING A FILTER ARRANGEMENT

(75) Inventors: Markus Herz, Munich (DE); Martin Richter, Munich (DE); Manuel Sutter, Munich (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 13/228,258

(22) Filed: Sep. 8, 2011

(65) Prior Publication Data
US 2012/0063928 A1    Mar. 15, 2012

Related U.S. Application Data (63) Continuation of application No. PCT/EP2010/052848, filed on Mar. 5, 2010.

(30) Foreign Application Priority Data

Mar. 9, 2009 (DE) .......................... 10 2009 012 347

(51) Int. Cl.
*F04B 39/16* (2006.01)
*F04B 17/03* (2006.01)
*B01D 29/00* (2006.01)

(52) U.S. Cl.
USPC ......... 417/313; 417/413.1; 210/314; 210/322

(58) Field of Classification Search
USPC ................ 417/313, 413.1; 210/314, 322, 490
See application file for complete search history.

(56) References Cited

U.S. PATENT DOCUMENTS

| | | | | |
|---|---|---|---|---|
| 3,523,408 A | * | 8/1970 | Rosenberg | 96/6 |
| 3,631,654 A | | 1/1972 | Riely | |
| 3,650,093 A | | 3/1972 | Rosenberg | |
| 4,004,587 A | * | 1/1977 | Jess | 604/126 |
| 4,142,524 A | * | 3/1979 | Jassawalla et al. | 604/123 |
| 4,278,084 A | | 7/1981 | Pope, Jr. | |
| 4,302,223 A | * | 11/1981 | Booth et al. | 96/6 |
| 4,515,606 A | * | 5/1985 | de Winter | 96/6 |
| 4,636,307 A | | 1/1987 | Inoue et al. | |
| 5,190,524 A | | 3/1993 | Wex | |
| 5,989,318 A | | 11/1999 | Schroll | |

(Continued)

FOREIGN PATENT DOCUMENTS

| | | |
|---|---|---|
| DE | 1949038 | 9/1969 |
| EP | 0489403 | 6/1992 |

(Continued)

*Primary Examiner* — Charles Freay
(74) *Attorney, Agent, or Firm* — Perkins Coie LLP; Michael A. Glenn (57) ABSTRACT

A pump for pumping a medium from a suction side to a pressure side includes a filter arrangement. The filter arrangement includes an inflow path, a first outflow path, and a second outflow path. A hydrophobic membrane filter is arranged between the inflow path and the first outflow path. A hydrophilic membrane filter is arranged between the inflow path and the second outflow path. At least one section of the hydrophobic membrane filter and one section of the hydrophilic membrane filter are located opposite each other at a distance of no more than 1 mm so that a gas bubble that moves along with a medium flowing in the inflow path comes into contact with the hydrophobic membrane filter during the movement. The first and second outflow paths of the filter arrangement are connected to the suction side of the pump.

8 Claims, 5 Drawing Sheets

(56) References Cited

U.S. PATENT DOCUMENTS

| | | | |
|---|---|---|---|
| 5,997,263 A * | 12/1999 | Van Lintel et al. | 417/413.2 |
| 7,422,565 B2 | 9/2008 | Delnevo et al. | |
| 2003/0042211 A1 | 3/2003 | Beplate | |
| 2005/0196304 A1 * | 9/2005 | Richter et al. | 417/413.2 |

FOREIGN PATENT DOCUMENTS

| | | |
|---|---|---|
| EP | 1873532 | 1/2008 |
| GB | 1221625 | 2/1971 |
| GB | 1510072 | 5/1978 |
| WO | WO 02/43841 | 6/2002 |

\* cited by examiner

PUMP HAVING A FILTER ARRANGEMENT

CROSS-REFERENCE TO RELATED APPLICATIONS

This application is a continuation of copending International Application No. PCT/EP2010/052848, filed Mar. 5, 2010, which is incorporated herein by reference in its entirety, and additionally claims priority from German Patent Application No. 102009012347.4-41, filed Mar. 9, 2009, which is incorporated herein by reference in its entirety.

The present invention relates to a pump having a filter arrangement.

BACKGROUND OF THE INVENTION

As miniaturization continues, micropumps are becoming more and more important. In practical use, micropumps may frequently use a particle filter at the inlet of the micropump, since otherwise particles existing in the pump chamber may cause leakage rates at the microvalves of the micropump, or particles might impede movement of a pump membrane. This may eventually cause the pump to fail.

In contrast to particles, most micropumps nowadays are tolerant toward gas bubbles (bubble-tolerant), so that gas bubbles need not be separated. Various gases are possible, the simplest case involving air bubbles.

Filters—no matter whether they are hydrophobic (liquid-repellant) or hydrophilic (liquid-attracting)—may frequently use a high pressure to be able to guide a gas bubble through a wetted filter. This applies to hydrophilic filters in particular. Frequently, a high pressure may also used for guiding, e.g., a drop of liquid through a hydrophobic filter. However, the elevated pressure that may be used for this is disadvantageous in terms of the flow resistance. Therefore, it is particularly for micropumps that the flow resistance should be influenced by the filter to as small a degree as possible.

In microfluidics, liquids are pumped through micropumps, and to avoid any contamination of the micropumps with particles, hydrophilic filters are mostly used in front of the inlet of the micropump. However, if a gas bubble is sucked in by the micropump at the wetted hydrophilic filters, the filter will be blocked by the gas bubble. However, micropumps are frequently not able to generate the high suction powers that may be used to suck the air bubble through the filter. The suction power (or suction pressure) that may be used may amount to up to one bar, for example. As a consequence, the system may fail completely.

In microfluidics, in the very frequent case that only small system pressures occur (such as in the so-called lab-on-a-chip applications, in micropumps, etc.), it is a general and almost fundamental problem that, on the one hand, particle filters are used, but, on the other hand, gas bubbles may block these filters with a very high pressure. The very high pressure results, for example, from the small pore size of the filters used, and the smaller the particles that are to be filtered out, the higher said pressure becomes. Since micropumps are very small, it is important to filter out even very small particles. However, in order that the small particles can be filtered out, the pore size should also be very small, which in turn increases the pressure that may be used to press gas bubbles, for example, through the filter. However, the micropumps used can only generate a limited pressure, which is frequently not sufficient to press the gas bubbles through the very small pores of the filter.

Conventional filters have a hydrophobic area and a hydrophilic area and are already known from conventional technology. For example, US 2003/0042211 discloses a known filter wherein a serial arrangement of hydrophobic and hydrophilic material is implemented to separate bubbles as well as particles from a liquid. What is also known are filters wherein gas bubbles may be removed from the flow path and passed on to the ambient air by using hydrophobic material. However, a disadvantage of said systems is that during operation with a micropump at the suction side, air bubbles may be sucked into the system from the environment by the hydrophobic material. U.S. Pat. No. 5,997,263 describes a further conventional filter for removing, or avoiding, any bubbles that may have become stuck at specific locations within the filter. However, the filter arrangement described is a one-dimensional filter and accordingly has a substantially higher flow resistance than a two-dimensional planar filter. In addition, with this one-dimensional filter implemented as a barrier, different hydrophobic and hydrophilic areas are implemented along the filter line, the duct cover as a whole being either hydrophobic or hydrophilic, however. This will also lead to an increase in the flow resistance.

Further bubble-tolerant particle filters are described in U.S. Pat. No. 4,278,084 and in GB 1510072 and are used for artificial feeding. However, for both filters it is useful to orient them such that the hydrophobic section comes to lie vertically above the hydrophilic one, so that any rising air bubbles will move toward the hydrophobic section due to gravity. It is only there that the air bubbles can pass the hydrophobic filter. The "proper" orientation of the filter is thus indispensable for the filter to function. In particular following a rotation by 180° about a horizontal axis, the filter will not function or its performance will be clearly poorer, since this leads to a marked increase in the flow resistance.

U.S. Pat. No. 3,523,408 A discloses a gas burner wherein a distance of 0.25 mm to 5 mm is provided between the essentially parallel liquid-repellant and liquid-wetting filter materials.

U.S. Pat. No. 5,190,524 A discloses a device for combining a plurality of liquid infusions to form a mixture. A chamber exhibits a plurality of separately closable inlets and one outlet for the mixture. One hydrophilic membrane and one hydrophobic membrane are provided within the chamber.

From U.S. Pat. No. 5,989,318 A, a device for separating water from a two-phase flow is known, wherein in one cavity a hydrophobic filter is provided for removing gas from the two-phase flow. In addition, a hydrophilic filter is provided to prevent water from exiting from a water outlet opening.

U.S. Pat. No. 4,302,223 A describes an air removal device exhibiting a pair of spaced-apart membranes, one of which is hydrophobic and the other one of which is hydrophilic. A pump is connected to the inlet of the air removal device via a degassing device.

EP 0489403 A2 describes a filter device comprising a housing and a microporous medium in the form of a synthetic polymeric microporous structure.

DE 1949038 A describes a separator for gases and liquids which has a liquid-repellant section arranged in front of an outlet for a gas, and a wettable section provided in front of an outlet for a liquid.

U.S. Pat. No. 7,422,565 B2 discloses a fluid separator for an infusion line which exhibits a receiving body and at least one hydrophilic membrane. The hydrophilic membrane is provided in a fluid passage so as to allow only liquid to pass.

SUMMARY

According to an embodiment, a pump arrangement may have: a pump for pumping a medium from a suction side to a pressure side, including: a filter arrangement including: an inflow path, a first outflow path and a second outflow path; a hydrophobic membrane filter located between the inflow path and the first outflow path; a hydrophilic membrane filter located between the inflow path and the second outflow path, wherein at least one section of the hydrophobic membrane filter and of the hydrophilic membrane filter are mutually opposed with a distance between them, said distance amounting to no more than 1 mm, so that a gas bubble which moves into a space located between the hydrophobic membrane filter and the hydrophilic membrane filter along with a medium flowing in the inflow path comes into contact with the hydrophobic membrane filter during the movement, wherein the first and second outflow paths of the filter arrangement being connected to the suction side of the pump, so that the gas bubble is guided through the filter arrangement.

An inventive pump arrangement comprises a filter arrangement which has both a hydrophilic membrane filter and a hydrophobic membrane filter, and the inflow path of the medium to be filtered is split up into a first outflow path and a second outflow path. The arrangement of the hydrophobic and hydrophilic and membrane filters is characterized in that at least a section of the hydrophobic membrane filter and a section of the hydrophilic membrane filter are located opposite each other at a distance of no more than 1 mm and no more than 200 µm. A gas bubble moving along with the medium flowing in the inflow path thus comes into contact with the hydrophobic membrane filter during the movement. Consequently, the gas bubble can easily pass the hydrophobic membrane filter, and a build-up of accumulating gas bubbles in front of a membrane filter is thereby prevented.

Thus, in this filter arrangement, gas bubbles are prevented—irrespective of the spatial orientation of the filter arrangement—from accumulating at one location of the filter and causing a congestion (settling) there and being pressed through the filter only gradually. Rather, the gas bubbles come into contact with the hydrophobic filter section during their movement and are guided—without stopping—through the hydrophobic filter section. The opposite arrangement of the filter sections may be achieved, for example, in that the filter membranes are implemented to be planar, and in that the hydrophobic and hydrophilic sections are located opposite each other in relation to their surface normal.

Thus, due to the small distance of the sections of the hydrophobic and hydrophilic membrane filters, a filter arrangement is provided which—irrespective of the orientation in space—provides a particle filter through which bubbles can easily pass without the flow resistance being increased.

Following the basic idea of the present invention, a filter arrangement thus is also provided wherein one, two or more hydrophobic and hydrophilic filter materials (filter sections) are arranged in parallel in the flow direction, the split-up flow path being reunited afterwards. The filter arrangement is disposed at the inlet (suction side) of a pump, for example.

In further embodiments, for example, the hydrophobic and hydrophilic filter sections may be arranged to be opposite each other in a planar manner, so that the maximum distance of 1 mm relates to any point of the planarly arranged filter sections. In further embodiments, the planarly implemented hydrophobic and hydrophilic membrane filters may taper on one side in the form of a wedge, so that the maximum distance of 1 mm relates to only part of the wedge. This also ensures that any air bubbles that exist within the medium come into contact—as penetration into the wedge continues—with the hydrophobic membrane filter and then can easily pass same without initially building up.

In further embodiments, instead of the wedge, the hydrophobic and hydrophilic membrane filters may also be mutually arranged in a cone shape. The apex of the cone is located in the downstream direction, so that the hydrophobic and hydrophilic membrane filter sections are formed, e.g., in a semi-circular shape (in the cross-sectional plane perpendicular to the flow direction) and form part of the cone surface, respectively. In this embodiment, too, an air bubble moves into the cone in the direction of the apex and may come into contact with the hydrophobic membrane filter during the movement. No later than at the apex, where, e.g., the hydrophobic and hydrophilic membrane filters converge—it not being necessary for them to make contact with one another—the maximum distance of 1 mm is reached, so that the air bubble will then come into contact with and can easily pass the hydrophobic membrane filter, again without being interrupted in its movement.

In further embodiments it is also possible for several hydrophobic and hydrophilic membrane filter sections to be implemented, the maximum distance in each case referring to a pair of oppositely arranged hydrophobic and hydrophilic membrane filter sections. If the membrane filter arrangement forms a cone surface, hydrophobic and hydrophilic sections may be configured to be stripe-shaped, for example. During its movement along with the medium, the air bubble will then come into contact with at least one hydrophobic filter section. In this context, the obvious thing is to arrange the hydrophobic and hydrophilic filter sections such that an air bubble will come into contact with the hydrophobic filter sections irrespective of the spatial orientation of the filter arrangement (please see below for further details).

Embodiments refer to pumps, in particular micropumps, which for their part can only generate limited suction pressure, so that the filter arrangement in any case is to prevent a build-up of gas bubbles, and that the filter is to exhibit a nearly constant flow resistance irrespective of the orientation with regard to gravity. In particular, in embodiments, any rising air bubbles are prevented from being able, due to gravity, to arrive at a filter section which has no hydrophobic areas implemented therein. In addition, it is advantageous that, due to the small dimensions, capillary forces may be exploited which may draw the liquid or the medium into the filter irrespective of gravity, so that the air bubble is guided to a section of the hydrophobic membrane filter as a result of the capillary forces. What is also advantageous about embodiments is that the pump does not suck in any ambient air since the split-up flow path, once having passed the hydrophobic and hydrophilic membrane filters, reunites afterwards and thus exhibits a closed system.

The advantages of embodiments are thus a low flow resistance, which is largely independent of spatial orientation. In addition, the pump cannot suck in any ambient air since the split-up flow path reunites after filtering. Any bubbles that may exist are thus guided through the filter arrangement without any noticeable pressure drop. Air bubbles are not removed from the medium, but may remain within the medium.

BRIEF DESCRIPTION OF THE DRAWINGS

Embodiments of the present invention will be detailed subsequently referring to the appended drawings, in which:

FIG. 1b shows a purely schematic representation of a pump having a bubble-tolerant filter in accordance with FIG. 1a;

DETAILED DESCRIPTION OF THE INVENTION

With regard to the description which follows, it should be noted that in the different embodiments, functional elements that are identical or have identical actions have identical reference numerals and that, therefore, the descriptions of said functional elements in the various embodiments are mutually exchangeable.

Figure 1A:
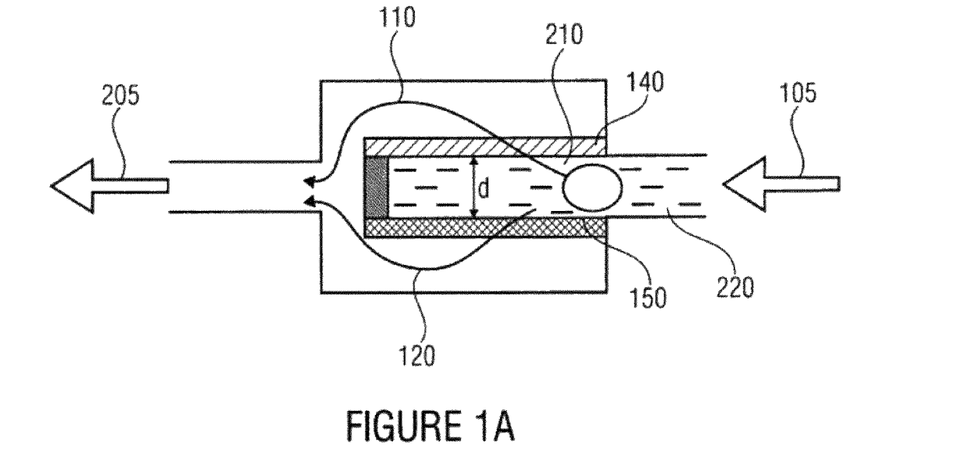
FIG. 1a shows a schematic representation of a bubble-tolerant filter for an embodiment of the present invention.
Figure 1B:
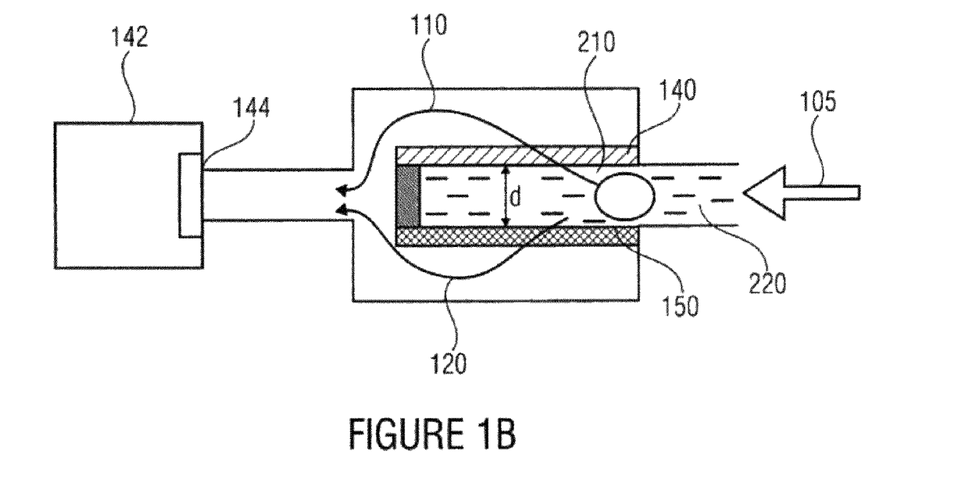

FIG. 1a shows a schematic representation of a filter arrangement for an embodiment of the present invention. The filter arrangement comprises an inflow path 105, a first outflow path 110 and a second outflow path 120. In addition, the filter arrangement comprises a hydrophobic membrane filter 140 located between the inflow path 105 and the first outflow path 110, and also a hydrophilic membrane filter 150 located between the inflow path 105 and the second outflow path 120. The membrane filter arrangement is characterized in that at least one section of the hydrophobic membrane filter 140 and one section of the hydrophilic membrane filter 150 are located opposite each other at a distance d of no more than 1 mm, so that a gas bubble 210, which moves along with a medium 220 flowing in the inflow path 105, comes into contact, during the movement, with the hydrophobic membrane filter 140. Any gas bubble 210 that may exist within the inflowing medium 220 thus cannot block the filter arrangement. During the movement, the gas bubble 210 passes the hydrophobic membrane filter 140. When the medium 220 comprising the air bubble 210 passes, no blocking pressure can be measured. FIG. 1b purely schematically shows a pump 142 having such a filter arrangement, the first outflow path 110 and the second outflow path 120 being connected to a suction side 144 of the pump 142.

For better understanding of the mode of operation, it makes sense first of all to describe some terms in more detail.

Figure 2:
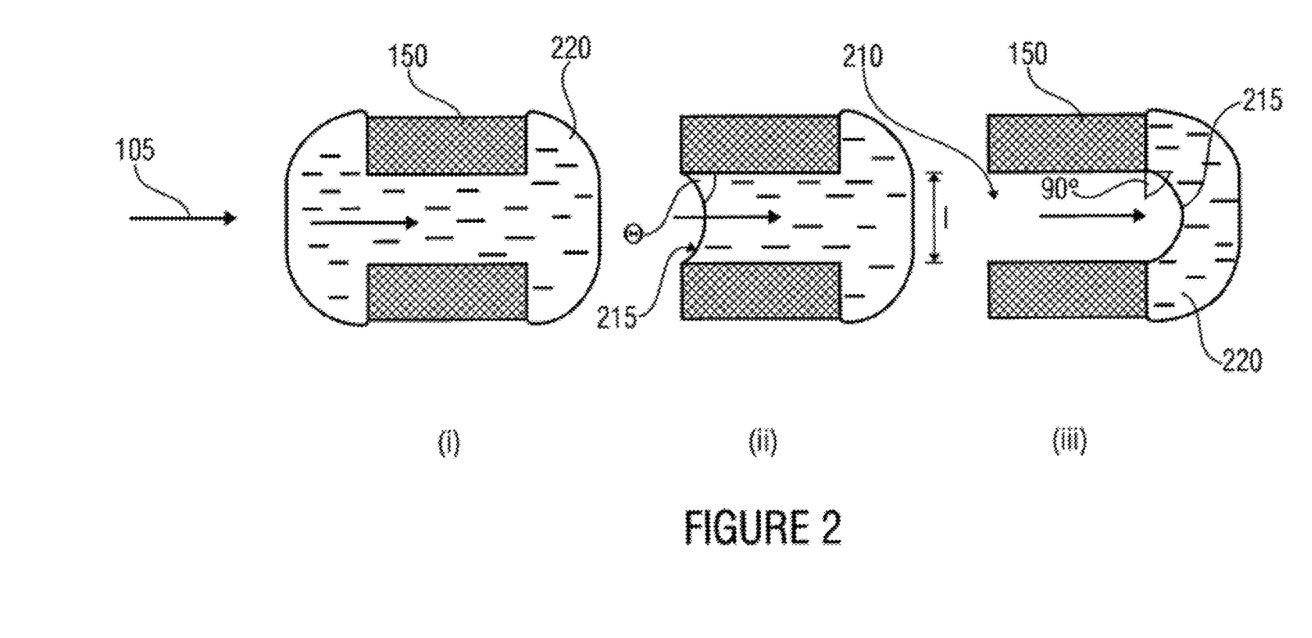
FIG. 2 shows a representation to illustrate the blocking pressure and the capillary forces.

FIG. 2 depicts an illustration of the blocking pressure and of the capillary forces exerted. Three phases of a passage of an air bubble through a hydrophilic filter 150 are schematically shown. In the first phase (i), the medium 220 initially flows through the hydrophilic filter 150 without any appreciable blocking pressure. In the second phase (ii), a gas bubble 210 comes from the inflow direction 105, so that a free surface 215 forms on the medium 210. The medium 220 wets the surface of the filter at a wetting angle θ smaller than 90°.

Thus, the material or at least the surface of the hydrophilic filter 150 is wetting (the medium or the liquid is "pulled upward" thereat). If the wetting angle θ were larger than 90°, this would classify the surface as being liquid-repellant (hydrophobic). If the wetting angle as shown in FIG. 2 is smaller than 90°, the medium is pulled along by the surface of the hydrophilic filter 150, so that a force may be used to remove the liquid from the gap. The force that may be used is nothing but the capillary force with which the liquid is drawn into the gap or the pore.

In the third phase (iii), the air bubble 210 has already been partially pressed through the hydrophilic filter 150, so that the free surface 215 appears at the rear output (in the flow direction) of the hydrophilic filter 150.

Measurement of the blocking pressure is frequently performed using the so-called bubble-point method or the bubble-point test. Said test is also known as a bubble-pressure test or bubble-point measurement and is used for testing the qualities of membranes. The pores of the membrane which, for example, form a passage opening of about 0.22 µm (e.g. for sterile filtration), are filled with the medium. The medium may comprise water, for example, and the easiest way to perform the filling process may is to flush the filter system with a pressure. For the test, the best thing is to slowly pressurize the membrane housing from the permeate side (for hollow-fiber modules), depending on the design. To displace the exemplary water from the pore, a force (pressure difference of the two filter sides) may be used. Said pressure difference is dependent on the pore diameter l:

$$\Delta p = \frac{4\sigma * \cos\theta}{l}, \quad (1)$$

wherein $\Delta p$=pressure difference, $\sigma$=surface tension of the liquid (water=72.75 mN/m), $\theta$=wetting angle, l=pore diameter.

To determine the bubble point, the pressure exerted on the filter is increased. At the same instant in time that air bubbles can be seen to exit continuously, the pressure is read out at the manometer. Since the surface tension, the wetting angle and the pressure difference are known, one can calculate, by adjusting the equation, e.g. the size of the largest pore of the membrane, and thus determine its quality of the membrane. According to the physical definition, a surface having a contact angle θ of less than 90° is hydrophilic (wetting), with a contact angle of more than 90° it is hydrophobic (non-wettable), as has been said. Thus, if the contact angle θ is smaller than 90° (cos θ>0), a positive pressure difference ($\Delta p>0$) will result.

For example, if a round pinhole aperture (pinhole face-plate, pinhole blind) is used, as is shown in FIG. 2, for example, and if free surfaces are formed due to the gas bubble, capillary forces will have to be overcome. For example, if a pinhole aperture is considered which has a diameter D through which this meniscus is to be moved, the minimum radius of curvature r of the meniscus will be given as r=D/2, and a pressure barrier $\Delta p_b$ will have to be overcome irrespective of the wetting angle:

$$\Delta p_b = \frac{2\sigma_{wa}}{r} = \frac{4\sigma_{wa}}{D}. \quad (2)$$

Given a duct diameter of, e.g., D=100 µm and given the surface tension of $\sigma_{wa}$=0.075 N/m for air/water, a pressure barrier $\Delta p_b$ will be 30 hPa, D=50 µm will result in $\Delta p_b$=60 hPa.

In case of a gap aperture (gap face-plate, gap blind), there is only one main plane of curvature, and therefore the blocking pressure existing at a gap having the height H is precisely half the blocking pressure of a pinhole aperture having a diameter D=H $$\Delta p_b = \frac{\sigma_{wa}}{r} = \frac{2\sigma_{wa}}{H}. \quad (3)$$

Given a gap height of, e.g., H=100 μm, and given the surface tension of $\sigma_{wa}$=0.075 N/m for air/water, the pressure barrier therefore will be $\Delta p_b$=15 hPa, for H=25 μm, $\Delta p_b$=30 hPa will result. However, suction pressures of up to 50 hPa may be easily generated by most micropumps.

Given the blocking pressure of filters, the aperture diameter corresponds to the pore size. Given a pore size of 5 μm, the blocking pressure in accordance with equation (2) will be about 600 hPa, and will be even higher for smaller pore diameters. However, suction pressures of this order of magnitude cannot be generated by common micropumps. This is why it is extremely important, especially with micropumps, to efficiently lead gas bubbles through the filter.

Figure 3:
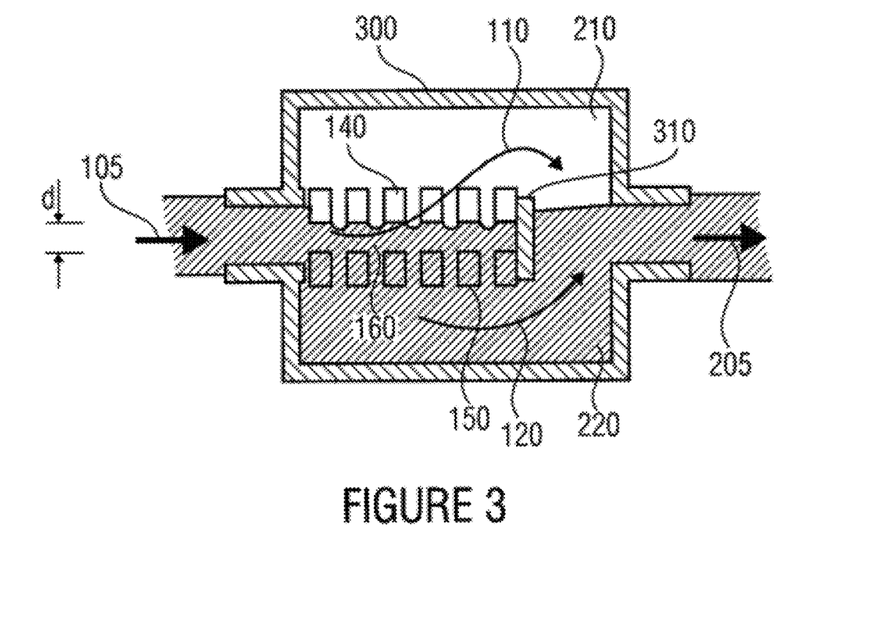
FIG. 3 shows a cross-sectional view of a filter arrangement having hydrophobic and hydrophilic membrane filters that are arranged in parallel to one other, for an embodiment.

FIG. 3 shows an embodiment of a filter arrangement located within a housing 300. The housing 300 has an input for the inflow path 105 and an output for a (shared) outflow path 205. Within the housing 300, the hydrophilic membrane filter 150 and the hydrophobic membrane filter 140 are arranged opposite each other such that a gap 160 forms between the hydrophilic membrane filter 150 and the hydrophobic membrane filter 140. In the embodiment shown, the hydrophilic membrane filter 150 and the hydrophobic membrane filter 140 may be configured to be planar, for example, so that the two planarly implemented filters are located opposite each other and so that the gap 160 thus essentially has a constant gap width d (constant distance). At the end of the gap 160, a termination wall 310 may be provided, for example, which is connected to the hydrophilic or the hydrophobic membrane filter 150, 140. The termination wall may be configured such that, for example, no build-up space for air bubbles 210 may form at the termination wall 310.

Advantageously, the gap width d is dimensioned such that—depending on the medium—capillary forces will draw the medium 220 into the gap and will thus reduce the flow resistance.

In the filter arrangement, the inflow path 105 is split up into a first outflow path 110 and a second outflow path 120, which reunite into a common (shared) outflow path 205. The first outflow path 110 passes the hydrophobic membrane filter 140, and the second outflow path 120 passes the hydrophilic membrane filter 150. When the medium 220 flows into the filter arrangement within the housing 300 through the inflow path 105, the medium 220 will flow through the hydrophilic membrane filter 150, since the hydrophobic membrane filter 140 represents a higher flow resistance to the medium.

During operation it may happen that a gas bubble 210, which may comprise air, for example, forms along the first outflow path 110 in the upper area of the housing 300 (against the force of gravity). If any further gas bubbles get into the filter arrangement through the inflow path 105 via the medium 220, said further gas bubbles will reach the upper part of the housing 300 via the first outflow path 110. At the same time, some of the air or gas located there will exit the housing 300 through the common outflow path 205. Thus, gas bubbles located within the medium 220 may pass the filter arrangement without there being a build-up of gas bubbles in front of a filter.

Figure 4:
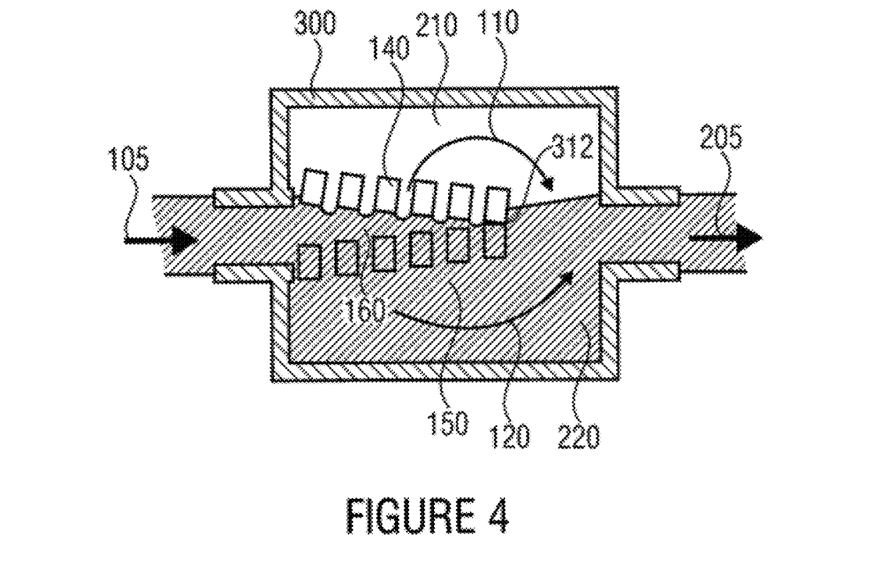
FIG. 4 shows a cross-sectional view with hydrophilic and hydrophobic membrane filters implemented in the form of a wedge, for further embodiments.

FIG. 4 shows a further embodiment wherein the hydrophilic membrane filter 150 and the hydrophobic membrane filter 140 again are arranged to be planar, for example, the two hydrophilic and hydrophobic membrane filters 150, 140 being arranged in a wedge shape in this embodiment. Thus, the hydrophilic and hydrophobic membrane filters taper to form a tip 312, so that the distance between the hydrophilic membrane filter 150 and the hydrophobic membrane filter 140 continuously decreases in the downstream direction toward the tip 312. In this embodiment, too, a medium which gets into the exemplary housing 300 via the inflow path 105 will be split up into a first outflow path 110 and a second outflow path 120, which will reunite to form a common outflow path 205 once they have passed the filters. The hydrophobic membrane filter is located along the first outflow path 110, so that any air bubbles that may be present within the medium 220, for example, will move via the hydrophobic membrane filter 140. At the same time, the medium 220 will move along the second outflow path 120 and reach the common outflow path 205 via the hydrophilic membrane filter 150.

The hydrophobic membrane filter and the hydrophilic membrane filter 150, 140 may extend perpendicularly to the drawing plane of FIG. 4 in a planar manner, so that said wedge-shaped arrangement results. This embodiment has the advantage that the distance between the hydrophilic and the hydrophobic membrane filters 150, 140 continuously decreases, so that even very small distances between the hydrophilic and the hydrophobic membrane filters 150, 140 may be implemented. Due to the very small distances, very small air bubbles may then come into contact with the hydrophobic membrane filter 140 during the movement without a congestive effect being caused. Upon contact of the gas bubbles with the hydrophobic membrane filter 140, a large gas bubble 210 may form above. For example, it is possible for the distance d to continuously decrease from a value of about 600 μm to a value of, e.g., less than 10 μm.

The wedge-shaped arrangement obtained may also be combined, in further embodiments, with the parallel arrangement as is shown in FIG. 3, so that, for example, at first the hydrophilic membrane filter 150 and the hydrophobic membrane filter 140 are arranged in parallel (and mutually opposed) in a planar manner and converge toward each other in a wedge-shaped manner in the downstream direction, as is shown in FIG. 4.

Figure 5:
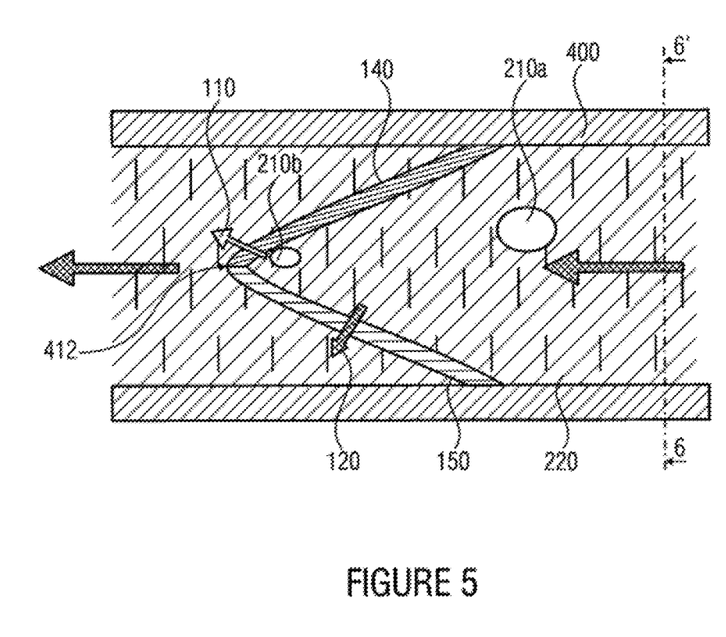
FIG. 5 shows a further schematic representation of a filter arrangement implemented in a cone shape.

FIG. 5 shows a further embodiment wherein the hydrophilic membrane filter 150 and the hydrophobic membrane filter 140 form a cone having an apex 412, the flow direction of the medium 220 being from the right to the left, and the apex 412 being located downstream. The hydrophobic membrane filter 140 and the hydrophilic membrane filter 150 are arranged inside and fixed to an outer enclosure 400. The enclosure may be cylindrical, for example, so that FIG. 5 represents a cross-sectional view along the longitudinal cylinder axis. The hydrophobic membrane filter 140 in this embodiment is arranged vertically above (against the gravitational field), and the hydrophilic membrane filter 150 is arranged vertically thereunder. Thus, any air bubbles 210 that are located within the medium 220 are directed into the interior of the cone in the downstream direction and come into contact with the hydrophobic membrane filter 140, which they may easily pass via the first outflow path 110. By contrast, the medium 220 may pass the hydrophilic membrane filter 150 via the second outflow path 120 in the side located vertically thereunder.

It can also be seen from FIG. 5 that the distance between the hydrophilic membrane filter 150 and the hydrophobic membrane filter 140 continuously decreases in the downstream direction toward the apex 412. Thus, even minute air bubbles 210 moving along the hydrophilic membrane filter 150 in the downstream direction may come into contact with the hydrophobic membrane filter 140 at the apex 412 and may easily pass said filter there. The intersection line 6'-6 represents the cross-sectional line to which the cross-sectional representation in FIG. 6b relates.

The embodiment shown in FIG. 5 may be expanded or improved also in that filter materials are used, sections of which are rendered hydrophobic/hydrophilic and then converge to form a wedge, so that even minute bubbles do not come into contact with the hydrophobic membrane and can thus pass the filter.

Figure 6A:
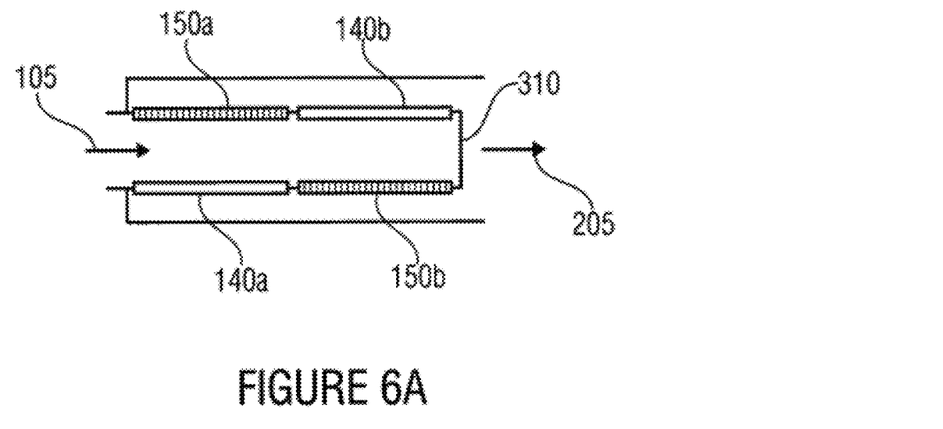
FIG. 6a show a filter arrangement having several hydrophobic and hydrophilic and 6b membrane filter areas.
Figure 6B:
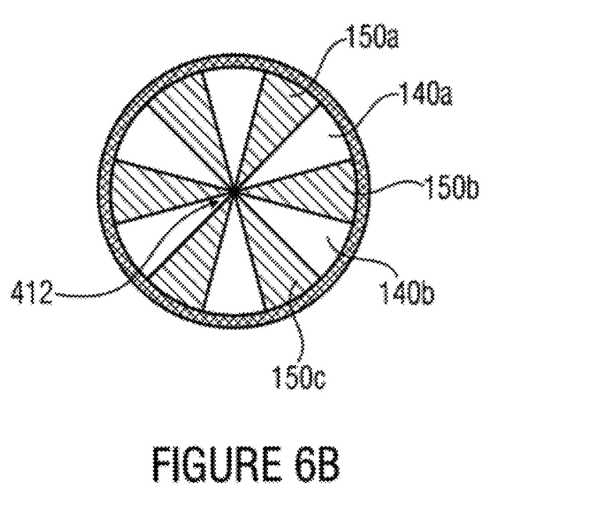

FIGS. 6a and 6b show further embodiments wherein the hydrophilic membrane filter 150 and the hydrophobic membrane filter 140 have several sections which are arranged in a mutually alternating manner, for example.

FIG. 6a shows, e.g., a further implementation of the filter arrangement as is shown in FIG. 3; in the embodiment shown in FIG. 6a, the hydrophobic membrane filter has a first section 140a and a second section 140b, and the hydrophilic membrane filter 150 also has a first section 150a and a second section 150b. Along the flow direction from the inflow path 105 to the outflow path 205, hydrophilic and hydrophobic sections are alternately arranged one behind the other in the flow direction. As compared to the embodiment shown in FIG. 3, the hydrophilic membrane filter 150 (in FIG. 3) thus is replaced by a first part of the hydrophobic membrane section 140a and a second part of a hydrophilic membrane section 150b, which are located one behind the other in the flow direction. At the same time, the hydrophobic membrane filter 140 shown in FIG. 3 is replaced by a first hydrophilic section 150a and a second hydrophobic section 140b, which again are located one behind the other in the flow direction. Thus, hydrophilic and hydrophobic sections 140a, 150a are arranged in parallel and mutually opposed in the flow direction, and a second hydrophobic section 140b and a second hydrophilic section 150b are arranged—adjacently thereto in the downstream direction—in parallel and mutually opposed. For example, the hydrophilic and hydrophobic sections 150a,b and 140a,b may again be implemented to be planar, so that the surfaces are parallel and mutually opposed.

The embodiment shown in FIG. 6a then has the advantage that even very small air bubbles which, e.g., propagate vertically along the upper duct area, come into contact with a hydrophobic membrane section 140, irrespective of the orientation of the filter arrangement. The order of the sections may be changed, however, so that at first a hydrophilic section 150 is formed, followed by a hydrophobic section 140—as long as a hydrophobic section 140 is invariably followed by, or precedes, a hydrophilic section 150.

In further embodiments it is also possible for the second hydrophilic and hydrophobic sections 140b, 150b, which are located downstream, to be configured to be mutually wedge-shaped, as is shown in FIG. 4, for example. Thus, it is possible for the termination wall 310 to become superfluous, in turn, when the hydrophobic second section 140b contacts or is connected to the hydrophilic second section 150b.

In further embodiments it is thus also possible to combine the parallel arrangement of hydrophilic and hydrophobic membrane areas 150, 140 with serial arrangements, i.e. that the hydrophobic and hydrophilic membrane sections 140, 150 are not arranged to be parallel and mutually opposed, but to be adjacent to one another in a planar manner, as is shown in FIG. 6a, for example.

FIG. 6b shows a further embodiment of a cone-shaped implementation of the hydrophilic and hydrophobic membrane areas 150, 140, as was shown in FIG. 5. It is a cross-sectional view that is perpendicular to the flow direction, for example from the direction of the inflow path 105, e.g. along the section line 6-6' in FIG. 5. FIG. 6b thus shows an embodiment wherein the membrane areas are arranged in a cone shape. In this context, the filter membrane alternatingly (e.g. in a clockwise direction) has hydrophilic and hydrophobic sections 150, 140, a first hydrophilic membrane area 150a being followed by a first hydrophobic membrane area 140a, for example, and adjacently thereto, a second hydrophobic membrane area 140b again being followed by a second hydrophilic membrane area 150b. This alternating arrangement continues until such time as the entire cone surface is formed by hydrophilic and hydrophobic membrane areas 150, 140 in a stripe-shaped manner, as is shown in FIG. 6b. All of the hydrophilic and hydrophobic membrane areas 150, 140 converge toward the apex 412, where all of them coincide and are connected to one another.

Thus, an air bubble 210 moving in the downstream direction will come into contact with a hydrophobic membrane area 140 during its movement. With relatively large air bubbles, contact with the hydrophobic duct area generally occurs earlier than with very small air bubbles, for which it may occur that they move up to the apex of the cone 412 and do not come into contact with a hydrophobic membrane section before this point. Thus, this embodiment also has the advantage that the air bubbles 210—irrespective of how gravity acts—come into contact with a hydrophobic membrane section 140 at an earlier or later point in time along their movement, and may then easily pass same. Thus, said congestive effect is prevented, which would involve—depending on the orientation or alignment of the filter in relation to gravity—that air bubbles may accumulate at specific locations of the filter and block the filter there, so that the flow resistance is increased. The filter arrangement of FIG. 6b comprises several hydrophilic or hydrophobic filter segments arranged in parallel.

In further embodiments, it is also possible to utilize two different membrane materials for the hydrophilic and hydrophobic 150, 140 filter membranes, and to also use different pore sizes. For example, utilization of two membranes having identical or different pore widths is possible, so that the air bypass may effectively be kept clear by using a smaller pore width for the air filter, since the bubble point depends on hydrophobicity and on the pore size.

For example, the hydrophilic and hydrophobic membrane filters 150, 140 may also be formed by means of a surface treatment of a uniformly implemented membrane filter. During the surface treatment, for example, the filter may be implemented, by means of surface coating, to be either hydrophobic or hydrophilic, depending on the material used for treating the surface. Coating technologies wherein materials such as silicon, plastic films, metal films, etc. may be generated to be structured, hydrophobic or hydrophilic are being developed to an increasing extent. Thus, the membrane as a whole may first of all be formed, and subsequently specific sections of the membrane are coated hydrophobically or hydrophilically, which may be effected selectively for specific sections. So-called bubble-point-free filters may therefore be directly incorporated into a micropump in that a filter element having a partly hydrophobic coating and a partly hydrophilic coating is mounted at the inlet of the micropump.

Bubble-tolerant particle filters in accordance with embodiments may also be summarized as follows. The membranes are designed to be parallel to the flow direction—for example in an opposing manner. The arrangement of the membrane is such that the function is entirely independent of the location, so that the filter will work equally well even in case of rotations by 180° about a horizontal axis. The hydrophilic membrane 150 may act like a sponge and absorb water. The gap thickness (distance) d may be selected, for example, to be as large as the smallest gas bubble 210 that occurs, it also being possible for the membranes to be located one on top of the other. Alternatively, the distance d may be selected such that at least 80% of the gas bubbles that occur have diameters larger than the distance d. The membranes may also be arranged in a wedge-shaped or pocket-shaped or funnel-shaped manner, the wedge-shaped arrangement also ensuring that the tiniest gas bubble 210 will come into contact with the hydrophobic membrane area 140. By means of the dimensioning of the gap 160 or of the duct, capillary forces may further be used for further reducing the flow resistance. Generally, a very low pressure drop exists in embodiments, which are therefore highly suited for microfluidic purposes (e.g. for micropumps).

Thus, embodiments not only avoid that air bubbles can accumulate at specific locations of the duct, but that, at the same time, small particles may deposit at hydrophobic locations, which might restrict or would even prevent the bubble-tolerant functioning of the filter. Thus, the disadvantages of conventional solutions can be avoided, wherein rotation by 180° about a horizontal rotational axis results in the filter becoming blocked, namely precisely when the hydrophilic membrane is at the top and, therefore, air accumulates at the top, and water can no longer be allowed to pass.

In embodiments, the distance d may be selected such that it is definitely smaller than the diameter of the existing bubble or of the smallest existing bubble. For example, the distance d may also amount to about 200 µm or about 100 µm or lie within a range below 100 µm. The membrane configuration arranged in a wedge- or cone-shaped manner, as is shown in FIG. 4 and FIG. 5, may comprise, e.g., an angle at the apex 312, 412, which angle is spanned by the hydrophobic membrane 140 and the hydrophilic membrane 150 and ranges between 5 and 50° or is at least smaller than 180°. The pore size may be set in a flexible manner, it being possible for the pores to be in an order of magnitude of 0.2 µm or to have a size ranging from 0.1 µm . . . 20 µm or from 5 µm to 10 µm.

Embodiments also include a filter arrangement wherein a branching of the flow is implemented by a filter element having one hydrophobic and one hydrophilic section, which are recombined after the branching. In further embodiments, the filter material of the hydrophilic sections is located opposite the filter material of the hydrophobic sections, so that a narrow fluid gap results between the two membrane filters.

In further embodiments, the hydrophobic and hydrophilic filters may be located opposite each other with a narrow gap 160 in between, a high aspect ratio of the gap 160 ensuring the existence of capillary forces, so that only liquid will remain within the gap 160 in front of the hydrophilic filter 150, and so that once the gas bubble has passed the hydrophobic filter 140, there will be no more gas bubbles in front of the hydrophilic filter 150.

Thus, two (or more) filter materials having different contact angles are arranged in parallel, one filter having a wetting action with regard to the liquid to be delivered (and therefore having only a low filling pressure during filling), whereas the other filter material has a higher filling pressure with regard to the liquid and is not wetting (i.e. air will remain within the second filter). The flow path splits up in front of the filters and reunites behind them. If an air bubble enters, it will take the path through the second hydrophobic filter without a blocking pressure becoming measurable here.

Since the filter arrangement is tolerant toward gas bubbles so that they may pass the filter (e.g. at the input of a micropump) without any resistance at all or without any appreciable resistance, the filter arrangement should have no direct opening to the environment to avoid ambient air being sucked in. Thus, the filter arrangement should be closed off from ambient air.

Therefore, embodiments of the invention provide a pump having a bubble-tolerant particle filter arranged at a suction side of the pump. In embodiments of the present invention, the pump is a micropump. Embodiments of the invention generally relate to pumps having a filter with a small pore size. Embodiments relate to gear pumps comprising a particle filter to prevent the pump from being blocked by particles. Generally, embodiments of the invention relate to pumps having structures that may become blocked or clogged up by particles and thus may use a filter.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A pump arrangement comprising:
   a pump for pumping a medium from a suction side to a pressure side, comprising:
   a filter arrangement comprising:
      an inflow path, a first outflow path and a second outflow path;
      a hydrophobic membrane filter located between the inflow path and the first outflow path;
      a hydrophilic membrane filter located between the inflow path and the second outflow path,
      wherein at least one section of the hydrophobic membrane filter and of the hydrophilic membrane filter are mutually opposed with a distance between them, said distance amounting to no more than 1 mm, so that a gas bubble which moves into a space located between the hydrophobic membrane filter and the hydrophilic membrane filter along with a medium flowing in the inflow path comes into contact with the hydrophobic membrane filter during the movement,
   wherein the first and second outflow paths of the filter arrangement being connected to the suction side of the pump, so that the gas bubble is guided through the filter arrangement, and
   wherein several oppositely arranged sections of the hydrophobic and hydrophilic membrane filters are configured downstream from the medium so that downstream from the medium, hydrophobic and hydrophilic sections alternate.

2. The pump arrangement as claimed in claim 1, the pump comprising a micro membrane pump.

3. The pump arrangement as claimed in claim 1, wherein the hydrophobic membrane filter and the hydrophilic membrane filter are arranged in parallel and mutually opposed in a planar manner.

4. The pump arrangement as claimed in claim 1, wherein the hydrophobic membrane filter and the hydrophilic membrane filter form a wedge tapering in the flow direction.

5. The pump arrangement as claimed in claim 1, wherein in the downstream direction, the hydrophobic and hydrophilic membrane filters are separated from each other by a straight termination wall, so that no build-up space for air bubbles will form at the termination wall.

6. The pump arrangement as claimed in claim 1, wherein a material of the hydrophobic membrane filter comprises a contact angle of more than 100° for a medium to be pumped, and wherein a material of the hydrophilic membrane filter comprises a contact angle of less than 80° for a medium to be pumped.

7. A pump arrangement comprising:
   a pump for pumping a medium from a suction side to a pressure side, comprising:
   a filter arrangement comprising:
      an inflow path, a first outflow path and a second outflow path;
      a hydrophobic membrane filter located between the inflow path and the first outflow path;
      a hydrophilic membrane filter located between the inflow path and the second outflow path,
      wherein at least one section of the hydrophobic membrane filter and of the hydrophilic membrane filter are mutually opposed with a distance between them, said distance amounting to no more than 1 mm, so that a gas bubble which moves into a space located between the hydrophobic membrane filter and the hydrophilic membrane filter along with a medium flowing in the inflow path comes into contact with the hydrophobic membrane filter during the movement,
      wherein the first and second outflow paths of the filter arrangement being connected to the suction side of the pump, so that the gas bubble is guided through the filter arrangement, and
      wherein the hydrophilic membrane filter and the hydrophobic membrane filter comprise a common membrane substrate, the hydrophilic membrane filter and the hydrophobic membrane filter comprising different surface coatings of the membrane substrate.

8. The pump arrangement as claimed in claim 7, wherein the hydrophobic membrane filter and the hydrophilic membrane filter form a cone tapering in the flow direction.

* * * * *